(12) United States Patent
Metternich

(10) Patent No.: US 11,993,112 B2
(45) Date of Patent: May 28, 2024

(54) DUST CAP ASSEMBLY AND DUST CAP DEVICE FOR THIS ASSEMBLY

(71) Applicant: Hamburger Patent Schmiede GmbH, Buchholz (DE)

(72) Inventor: Heinz-Ruediger Metternich, Eversen-Heide (DE)

(73) Assignee: Hamburger Patent Schmiede GmbH, Buchholz (DE)

( * ) Notice: Subject to any disclaimer, the term of this patent is extended or adjusted under 35 U.S.C. 154(b) by 641 days.

(21) Appl. No.: 17/264,913

(22) PCT Filed: Aug. 5, 2019

(86) PCT No.: PCT/DE2019/100708
§ 371 (c)(1),
(2) Date: Feb. 1, 2021

(87) PCT Pub. No.: WO2020/030225
PCT Pub. Date: Feb. 13, 2020

(65) Prior Publication Data
US 2021/0260944 A1    Aug. 26, 2021

(30) Foreign Application Priority Data

Aug. 7, 2018    (DE) .................... 20 2018 104 542.3

(51) Int. Cl.
*B60D 1/60* (2006.01)
*B62D 53/08* (2006.01)

(52) U.S. Cl.
CPC ............. *B60D 1/605* (2013.01); *B62D 53/08* (2013.01)

(58) Field of Classification Search
CPC ................................ B62D 53/08; B60D 1/605
(Continued)

(56) References Cited

U.S. PATENT DOCUMENTS

| 5,691,140 A | * | 11/1997 | Noren | .................... | C12N 15/73 |
| | | | | | 435/5 |
| 5,791,677 A | * | 8/1998 | Froehlich | ................. | B60D 1/60 |
| | | | | | D12/162 |

(Continued)

FOREIGN PATENT DOCUMENTS

| DE | 1655977 A1 | 5/1953 |
| DE | 102006033899 A1 | 1/2008 |

(Continued)

OTHER PUBLICATIONS

International Search Report issued on Dec. 18, 2019, in International Application No. PCT/DE2019/100708.

*Primary Examiner* — Tony H Winner
(74) *Attorney, Agent, or Firm* — Stephan A. Pendorf; Patent Central LLC

(57) ABSTRACT

A dust cap assembly including a semi-trailer (2) and a towing vehicle (3). The dust cap assembly is for closing a king pin (21) which has been hollowed out with a borehole (22) for automatic fifth-wheel coupling. A dust cap device (1) is arranged in contact with the underside (20) of the semi-trailer (2) and such that it can rotate about the king pin (21). In order to mount the dust cap device (11) such that it can rotate about the king pin (21), a circular ring-shaped bearing disc (25) having a circular bearing seat (26) is provided, which is secured coaxially to the king pin (21) on the underside (20) of the semi-trailer (2). The circular bearing seat (26) on the circular ring-shaped bearing disc (25) has a first sliding bearing edge (261) on the inner circular opening and a second sliding bearing edge (262) on the outer rim, in which the dust cap device (1) engages. Also, a dust cap device for this assembly.

7 Claims, 1 Drawing Sheet

Figure 1:
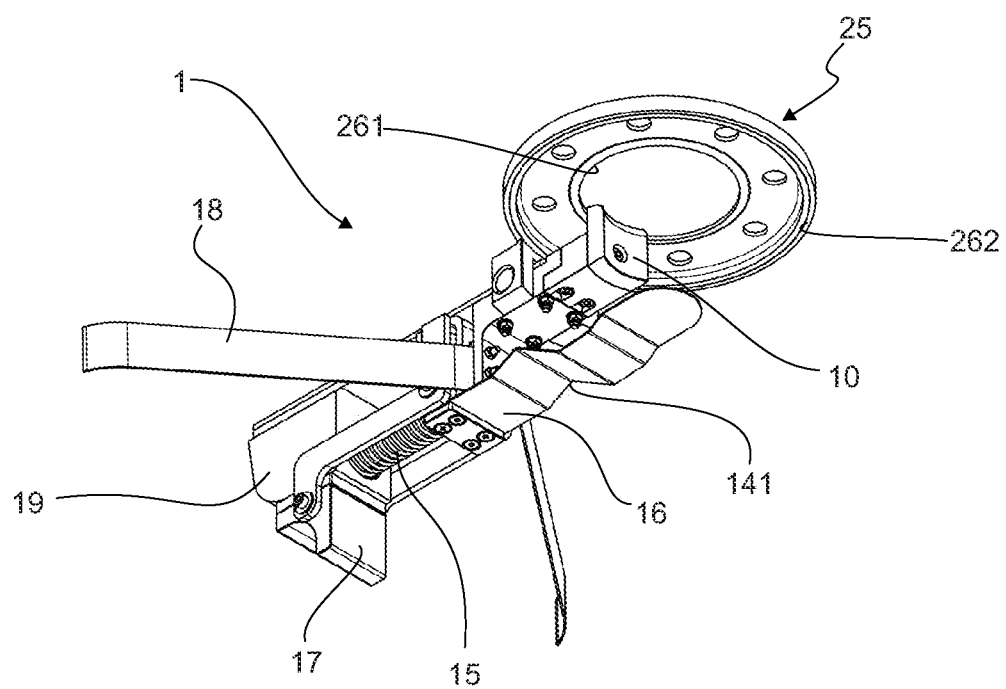

(58) Field of Classification Search
USPC .......................................................... 280/507
See application file for complete search history.

(56) References Cited

U.S. PATENT DOCUMENTS

| | | | |
|---|---|---|---|
| 7,014,205 B1* | 3/2006 | Reilly | B60D 1/60 |
| | | | 280/507 |
| 8,070,178 B2* | 12/2011 | Desmarais | B62D 53/0842 |
| | | | 280/507 |
| 11,345,197 B2* | 5/2022 | Metternich | B60D 1/015 |
| 2002/0190497 A1 | 12/2002 | Metternich | |
| 2007/0235983 A1* | 10/2007 | Braun | B60D 1/60 |
| | | | 280/507 |
| 2009/0267321 A1 | 10/2009 | Alguera et al. | |
| 2010/0059967 A1* | 3/2010 | Alguera | B62D 53/125 |
| | | | 280/420 |
| 2020/0001669 A1 | 1/2020 | Metternich | |

FOREIGN PATENT DOCUMENTS

| | | |
|---|---|---|
| DE | 102008001349 A1 | 11/2009 |
| DE | 202016102707 U1 | 7/2016 |
| DE | 202017101339 U1 | 5/2017 |
| EP | 1240067 A2 | 9/2002 |

* cited by examiner

DUST CAP ASSEMBLY AND DUST CAP DEVICE FOR THIS ASSEMBLY

The invention relates to a dust cap assembly with a semi-trailer and a towing vehicle for closing a king pin which has been bored-out with a borehole for automatic fifth-wheel coupling, and which is arranged on the underside of the semi-trailer functioning as a counter bearing for a saddle plate of the towing vehicle, wherein a dust cap device is arranged in contact with the underside of the semi-trailer and such that it can rotate about the king pin, the device having a dust cap for covering the borehole of the king pin, the dust cap designed such that it can shift on the dust cap device from a basic position covering the borehole in the king pin into a coupling position uncovering the borehole during a coupling process. The invention also relates to a dust cap device for this assembly.

In road freight transport, the transport of goods with so-called articulated tractor-trailers has become well established. This is a combination of a towing vehicle with a fifth-wheel and a semi-trailer which rests with part of its weight on the fifth-wheel of the towing vehicle and which picks up the goods to be transported. The connection between the towing vehicle and the semi-trailer is achieved via a so-called fifth-wheel. For this purpose, a kingpin is arranged on the semi-trailer, pointing orthogonally downwards, on the underside of the semi-trailer, serving as a counter bearing to the saddle plate of the towing vehicle. Since the fifth-wheel is thus arranged on the underside of the semi-trailer facing the road, mostly directly above the rear axle or axles of the tractor, the fifth-wheel is exposed to heavy soiling.

Furthermore, there are more recent developments for the automation of the fifth wheel, in particular for the automatic connection of the electrical lines and the brake air lines to the semi-trailer, which for example comprise a separate connector bracket for a semi-trailer of a semi-trailer, which have a support element pivotable about a bearing and a connector arranged in the support element, this connector bracket being pivotable about the axis defined by the king pin, as described in DE 1 655 977 A1, DE 10 2006 033 899 A1 or DE 10 2008 001 349 A1. Accordingly, a socket arrangement that matches the connector bracket can be provided on the towing vehicle provided with a fifth wheel, which can be coupled into the connector bracket of the semi-trailer during the coupling process.

Alternatively, there is an automated fifth-wheel which, when mechanically latching the claws arranged on the fifth-wheel plate, engages in an axial borehole in the king pin by means of corresponding lifting plugs to grip the king pin, as described in EP 1 240 067 B1. As soon as the semi-trailer with a bored-out king pin is coupled in a corresponding automatic coupling, dirt ingress into the sensitive interior of this additional contact for electrical conductors and brake air is precluded. However, a corresponding semi-trailer can become dirty when it is not coupled, for example when it is parked. Significantly greater contamination is to be assumed when coupling a semi-trailer prepared in this way to a tractor without an automatic coupling system, since the hollow borehole with the sensitive contacts therein is freely accessible to environmental influences. In the second case in particular, with a coupling on a tractor without automatic connection of the electrical and pneumatic lines, the stirring up of dirt etc. during driving would also contribute significantly to the contamination of the hollow borehole of the kingpin of the semi-trailer.

Therefore, a dust cap assembly has already been proposed in DE 20 2017 101 339 U by the same inventor. This dust cap assembly is characterized in that a dust cap device lies against the underside of the semi-trailer and is arranged rotatably around the king pin, this having a dust cap to cover the borehole provided therein and the dust cap is designed to be displaceable on the dust cap device during the coupling process from a basic position covering the borehole in the king pin to a coupling position exposing the borehole. The borehole in the king pin is thus protected by the dust cap when the semi-trailer is uncoupled, the dust cap automatically releasing the borehole in the king pin during the coupling process for coupling the electrical and pneumatic connections contained therein. If the trailer with the dust cap device is coupled to a towing vehicle without an automatic fifth-wheel, the dust cap remains in its protective position, covering the borehole in the king pin. As a result, dirt that is thrown up while driving cannot penetrate the borehole and thus also the sensitive contacts etc. of the king pin. The dust cap device on the underside of the semi-trailer does not interfere with the mobility of the fifth-wheel between the towing vehicle and the semi-trailer due to its ability to rotate around the king pin, regardless of whether the towing vehicle is equipped with an automatic fifth-wheel or not.

In a special embodiment it has been proposed to anchor the dust cap device directly in guide grooves on the part of the king pin body which is close to the underside of the semi-trailer, so that it can rotate. Due to strength problems for the king pin, which is heavily stressed during driving and especially in the event of accidents, it is not possible to provide a groove at this point on the king pin.

The object of the invention is therefore to further develop the dust cap assembly or the dust cap device for this assembly according to DE 20 2017 101 339 U so that a safe, rotatable mounting of the dust cap device coaxially to the semi-trailer is possible without profound structural interventions in the semi-trailer and without weakening the king pin.

This object is achieved with a dust cap assembly according to claim 1 and a related dust cap device.

As a result of the fact that a circular bearing disc is provided with a circumferential bearing seat for the mounting of the dust cap device so that it can rotate around the king pin and is fastened coaxially to the king pin on the underside of the semi-trailer, the dust cap device can be fastened in the area of the king pin on the underside of the semi-trailer, the axis of rotation for the dust cap device being coaxial to the axis of rotation of the king pin, without the king pin being weakened. The circumferential bearing seat has, on the annular bearing disk, a first sliding bearing edge on its inner circular opening and a second sliding bearing edge on the outer edge, in which the dust cap device engages. Thus, the dust cap device is hung freely rotatable around the king pin so that any tilting moments are well absorbed by the broad mounting base.

A particularly simple attachment of the dust cap device to the semi-trailer is achieved in that the king pin has an annular disk-shaped fastening base with first fastening bores, the annular bearing disk has second fastening bores aligned with the first fastening bores, so that the king pin and the dust cap device can be fastened to the underside of the semi-trailer by fastening screws penetrating through the first and second fastening bores. If necessary, longer fastening screws should be used to match the material size of the bearing disk.

If the kingpin has a cylindrical kingpin body protruding downwards from the underside of the semi-trailer, and the dust cap device has a sliding surface directed towards the king pin body and resting on it, the dust cap device is also supported directly on the king pin, whereby any tilting moments are optimally diverted.

In order to be able to reliably open and close the dust cap, the dust cap device has a lateral guide with a thrust element for moving the dust cap, the thrust element being designed to be movable in a direction radial to the kingpin, parallel to the underside of the semi-trailer and being coupled to the dust cap.

A driver is preferably provided on the thrust element, which during the coupling process can be carried along by an actuating means provided on the fifth-wheel of the coupling towing vehicle, only towing vehicles with automatic fifth-wheel having this actuating means on the fifth-wheel. The actuating means on the saddle plate is preferably a hold-down device bridging the insertion slot, the installation position of which allows the king pin to slide freely in the insertion slot and which interacts with the driver, so that the hold-down device moves the driver and thus the dust cap into the coupling position exposing the borehole and in the coupling process holds this position against the pressure of the first spring. This solves in a mechanically simple manner that when the fifth-wheel of the towing vehicle approaches the king pin, the thrust element and thus the cover is displaced laterally when the towing vehicle has an actuating means, that is, an automatic fifth-wheel. Otherwise the dust cap remains in its basic position on the kingpin.

In order to ensure that the dust cap device is securely closed again after the towing vehicle has been uncoupled from the semi-trailer, a first spring is provided in the lateral guide which keeps the thrust element preloaded by the first spring in the direction of the basic position covering the borehole in the king pin.

A second spring can be provided on the thrust element, which holds the dust cap loaded by this second spring in the axial direction on the free end face of the king pin. A sufficient contact pressure of the dust cap directed at the end face of the king pin is thus ensured via this second spring. In addition, the inside of the dust cap can have a sealing, rubberized coating, so that dirt and, to a large extent, moisture are excluded from entering the borehole of the king pin.

The dust cap device should have a width which is smaller than the width of the insertion slot of the saddle plate. The dust cap device thus fits between the insertion slot of the saddle plate, so that the transmission of movement for the dust cap can be made as short as possible. Furthermore, it is preferred that the structural height of the dust cap device is less than or equal to the height of the king pin. It is only necessary to ensure that the dust cap can slide on and off the face of the king pin without any problems. Of course, it may be necessary for the driver of the dust cap device to exceed the maximum width and/or maximum height defined above so that it can be actuated by the saddle plate or an element arranged on it during the coupling process.

So that the dust cap device is centered as quickly as possible in the insertion slot of the saddle plate during the coupling process, the dust cap device has on its side flanks leaf springs spreading out arrow-shaped on both sides when installed.

It is crucial that the dust cap device is arranged on a semi-trailer on its king pin, freely rotatable about it. Accordingly, such semi-trailers can be coupled to tractors with a fifth-wheel in the usual way. The dust cap device, which can be rotated around the king pin, does not interfere with the coupling process or the free rotation of the fifth-wheel connection, and thus does not restrict the functionality of the articulated tractor-trailer.

If the towing vehicle does not have an automatic fifth-wheel coupling with electrical and pneumatic contacts via a plug connection in the borehole of the king pin, in this case the saddle plate of the tractor (towing vehicle) will not have a hold-down device, so that the dust cap does not become removed from the king pin during the coupling process to the trailer with the dust cap device. The protective function of the dust cap is therefore fully retained even in a configuration with a semi-trailer coupled to a "normal" towing vehicle. Only if a towing vehicle with a fifth-wheel has a hold-down device or a corresponding component for actuating the driver, is the driver of the dust cap device laterally displaced against the force of the first spring during the coupling process, so that the dust cap is removed from the kingpin and the borehole in the kingpin is exposed for connecting the electrical and pneumatic contacts.

An exemplary embodiment of the invention is described in detail below with reference to the accompanying drawings.

There is shown in:

FIG. 1 a spatial representation of a dust cap device and

Figure 2:
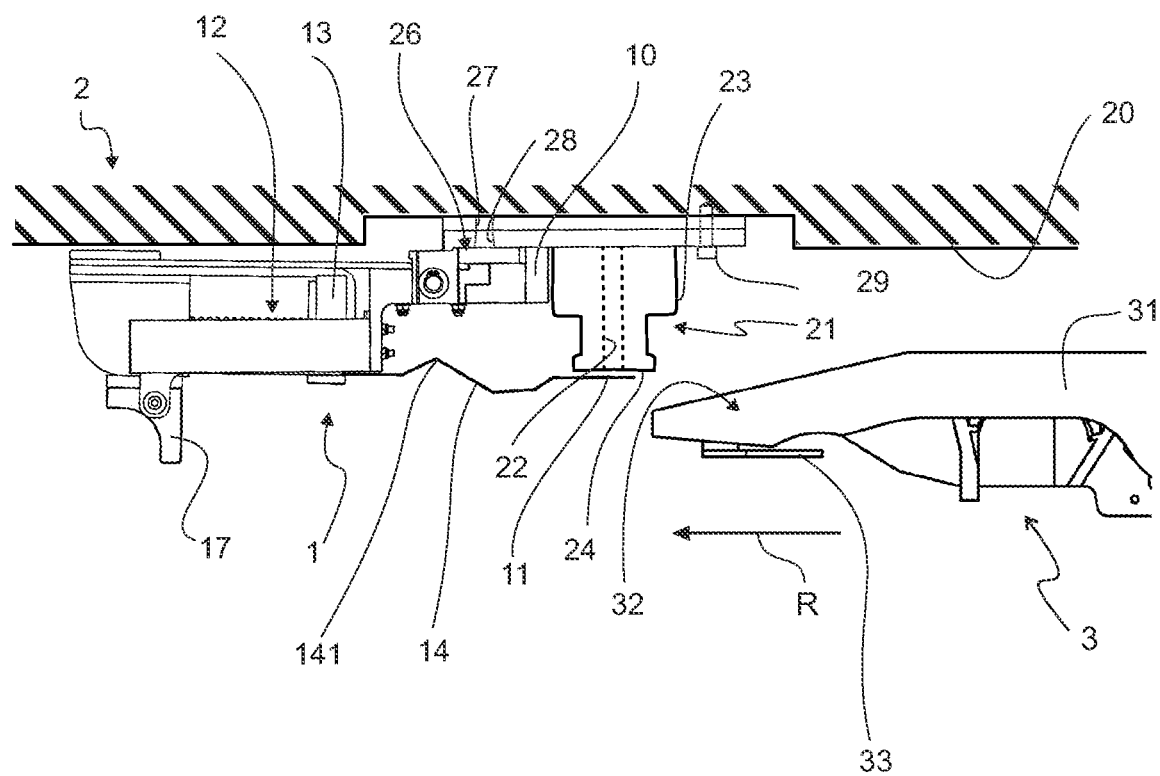

FIG. 2 the dust cap device shown in FIG. 1 in a side view with king pin and fifth wheel or saddle plate.

In FIG. 1, a dust cap device 1 is shown in a three-dimensional view, which is attached to an underside 20 of a semi-trailer 2 together with a king pin 21 provided there. The overall situation immediately before a coupling process is shown in FIG. 2 in a side view. There the underside 20 of the semi-trailer 2 is shown in detail. In the center, the king pin 21 is arranged with its axis of symmetry extending orthogonally downward. In the exemplary embodiment according to FIG. 2, a saddle plate 31 is shown coming from the right as part of the towing vehicle 3 to be coupled to the semi-trailer 2. When the towing vehicle 3 travels further backwards (to the left in the plane of the drawing in accordance with arrow R in FIG. 2), the saddle plate 31 would lock into place with the king pin 21 as a fifth-wheel coupling connection. In this case, the king pin 21 is received by the saddle plate 31 in an insertion slot 32 provided in the saddle plate 31 and is enclosed and locked by means of movable claws and coupled therewith.

On the king pin 21, a dust cap device 1 is freely rotatable about the king pin 21 and is arranged in contact with the underside 20 of the semi-trailer 2. The dust cap device 1 has a dust cap 11 which covers a coaxial borehole 22 in the king pin 21 on its lower end face 24, as can be seen in FIG. 2.

The rotatable mounting of the dust cap device 1 on the king pin 21 is achieved in that an annular bearing disk 25 with a circumferential bearing seat 26 is provided, which is fastened coaxially to the king pin 21 on the underside 20 of the semi-trailer 2. The annular bearing disk 25 has an inner circular opening through which the king pin 21 protrudes. A first plain bearing edge 261 is formed on the bearing disk 25 as the first part of the bearing seat 26 and on the outside on the outer edge of the bearing disk 25 a second plain bearing edge 262 is formed as the second part of the bearing seat 26.

The bearing disc 25 also has second fastening bores 28, which are provided in the same number and orientation as the first fastening bores 27 for the king pin 21 for common fastening on the underside 20 of the semi-trailer 2. For this purpose, fastening screws 29 are provided which reach through the first and second fastening bores 27, 28, which are designed to be aligned with one another.

The dust cap device 1 engages in the first and second sliding bearing edges 261, 262 of the bearing seat 26 of the bearing disk 25 so that it is rotatably mounted under the underside 20 of the semi-trailer 2 around the center axis of the bearing disk 25 and thus around the axis of symmetry of the king pin 21. The sliding bearing edges 261 and 262, which are radially spaced from one another from the center axis, transmit a tilting moment acting on the dust cap device into the semi-trailer. The dust cap device 1 thus remains in contact with or almost in contact with the underside 20 of the semi-trailer 2.

In order to be able to better support the weight of the dust cap device 1 protruding radially from the king pin 21, a sliding surface 10 is also formed on the side of the dust cap device 1 facing the protruding king pin body 23, which sliding surface rests slidingly against the cylindrical king pin body 23 and thus forms a supplementary support.

Furthermore, the dust cap device 1 has a lateral guide 12 in which a laterally displaceable thrust element 13 is guided. A connecting element 14 is attached to the thrust element 13 and is connected to the dust cap 11 at its other end. Furthermore, a driver 17 is provided on the thrust element 13, which can be mechanically actuated by a component of the towing vehicle 3, in particular the saddle plate 31, during the coupling process. The thrust element 13 is provided with a first spring 15, which is designed as a helical compression spring, in order to bias the dust cap 11 connected to the thrust element 13 via the connecting element 14 in the closed position (basic position) shown in FIG. 2 in a spring-loaded manner. Furthermore, a second spring 16 is provided, which is designed as a steel band spring, which loads the dust cap 11 onto the end face 24 of the king pin 21 in order to achieve the dust cap 11 resting on the end face 24 of the king pin 11 as directly as possible and thus largely sealingly.

Furthermore, leaf springs 18 are arranged on the dust cap device 1 in the area of the lateral guide 12 in the installation orientation, laterally splayed backwards at an angle, as can be seen in FIG. 1. During the coupling process, these leaf springs 18 cooperate with the initially very wide insertion slot 32 of the saddle plate 31 in such a way that the dust cap device 1, which is freely rotatable around the king pin 21, is held in an elastically yielding manner in an orientation facing toward the saddle plate 31.

The coupling process for a dust cap assembly as described above is described in more detail below.

The situation shown in side view in FIG. 2 shows the saddle plate 31 of the towing vehicle 3 in a sectional side view. Furthermore, the semi-trailer 2 is shown with its underside 20 and the kingpin 21 attached to it and the dust cap device 1 rotatably attached to the kingpin 21 by means of the bearing disc 25. In the situation according to FIG. 2, the towing vehicle 3 is in the starting position before the start of the coupling process. By traveling backwards, represented by arrow R, the saddle plate 31 of the towing vehicle 3 approaches the kingpin 21 of the semi-trailer 2.

With further backward travel according to arrow R, the king pin 21 is received by the still wide insertion slot 32 of the saddle plate 31. The saddle plate 31 has a hold-down device 33, which bridges the two legs of the saddle plate 31 in the area of the wide insertion slot 32 below the vertical extension of the king pin 21. This hold-down device 33 thus slides unhindered over the king pin 21 and the dust cap device 1 rotatably attached around it and comes into contact with the driver 17 of the thrust element 13 of the dust cap device 1.

During further reverse travel R of the towing vehicle 3, the driver 17 and thus the thrust element 13 is shifted laterally to the left in the plane of the drawing according to FIG. 2. During this movement, hold-down 33 moves driver 17 further to the left in the direction of the drawing until driver 17 reaches its end position and is raised around a driver guide 19 so that hold-down 33 can slide over the end of driver 17. However, in the coupled position of the fifth-wheel the hold-down 33 remains below the driver 17. Thus, the dust cap 11, which has now completely exposed the end face 24 and thus the borehole 22 of the king pin 21, cannot slide back into its basic position urged by the first spring 15.

When uncoupling, the entire process proceeds in reverse order. It should be noted that by providing a crank 141 in the connecting element 14, the dust cap 11 is raised slightly against the second spring 16 (steel band spring) and thus is moved from its retracted position onto the end face 24 of the king pin 21 in the position shown in FIG. 2. The return movement of the thrust element 13 with the dust cap 11 attached to it takes place by decompression of the first spring 15.

REFERENCE NUMERALS 1 dust cap device
10 sliding surface
11 dust cap
12 lateral guide
13 thrust element
14 connecting element
141 crank
15 first spring
16 second spring
17 driver
18 leaf spring
19 driver guide
2 semi-trailer
20 underside
21 king pin
22 bore
23 kingpin body
24 face
25 bearing disc
26 bearing seat
261 first plain bearing edge
262 second plain bearing edge
27 first mounting holes
28 second mounting holes
3 towing vehicle
31 fifth-wheel
32 insertion slot
33 actuating means, hold-down device
R backwards.

The invention claimed is:

1. A dust cap assembly for a semi-trailer (2) having an underside (20) and adapted to being towed by a towing vehicle (3), the dust cap assembly for closing a king pin (21) which has been bored out with a borehole (22) for an automatic fifth-wheel coupling and which is arranged on the underside (20) of the semi-trailer (2), the king pin (21) serving as a counter bearing for a saddle plate (31) of the towing vehicle (3), the dust cap assembly comprising:
   a dust cap device (1) arranged in contact with the underside (20) of the semi-trailer (2) adjacent to and rotatable around the king pin (21), and
   an annular bearing disc (25) for mounting the dust cap device rotatable about the king pin (21), wherein the dust cap device (1) has a dust cap (11) for covering the borehole (22) in the king pin (21), wherein the dust cap (11) is designed to be displaceable on the dust cap device (1) during a coupling process with a towing vehicle (3) from a basic position covering the borehole (22) in the king pin (21) into a coupling position that exposes the borehole (22), wherein the annular bearing disc (25) comprises a circular bearing seat (26 which is secured coaxially to the king pin (21) on the underside (20) of the semi-trailer (2), and wherein the circular bearing seat (26) has on the annular bearing disc (25) a first sliding bearing edge (261) on an inner circular opening of the circular bearing seat (26) and a second sliding bearing edge (262) on an outer rim of the circular bearing seat (26), in which the dust cap device (1) engages.

2. The dust cap assembly according to claim 1, wherein the king pin (21) has a circular disk-shaped fastening base with first fastening bores (27), and wherein the annular bearing disk (25) has second fastening bores (28) aligned with the first fastening bores (27) so that the king pin (21) and the dust cap device (1) can be fastened to the underside (20) of the semi-trailer (2) by fastening screws (29) passing through the first and second fastening bores (27, 28).

3. The dust cap assembly according to claim 1, wherein the king pin (21) has a cylindrical king pin body (23) protruding downward from the underside (20) of the semi-trailer (2), and wherein the dust cap device (1) has a sliding surface (10) facing the king pin body (23) and abutting slidingly thereagainst.

4. The dust cap assembly according to claim 1, wherein the dust cap device (1) has a lateral guide (12) with a thrust element (13) for moving the dust cap (11), and wherein the thrust element (13) is movable in a direction radial to the kingpin (21) parallel to the underside (20) of the semi-trailer (2) and is coupled to the dust cap (11).

5. The dust cap assembly according to claim 4, wherein a driver (17) is provided on the thrust element (13) which, during a coupling process, can be carried along by an actuating means (33) provided on the saddle plate (31) of a coupling towing vehicle (3).

6. The dust cap assembly according to claim 5, wherein the actuating means (33) on the saddle plate (31) is a hold-down device (33) bridging an insertion slot (32) on the saddle plate (31), the installation position of which allows the king pin (21) to slide freely through the insertion slot (32) and which cooperates with the driver (17) so that the hold-down device (33) moves the driver (17) and thus the dust cap (11) into the coupling position that exposes the borehole (22) and holds the dust cap (11) in this position against the pressure of a first spring (15).

7. The dust cap assembly according to claim 4, wherein a first spring (15) is provided in the lateral guide (12), which first spring (15) biases the thrust element (13) in the direction of covering the borehole (22) in the king pin (21).

* * * * *